United States Patent
Chen et al.

(10) Patent No.: US 9,045,375 B2
(45) Date of Patent: Jun. 2, 2015

(54) METHOD FOR PRODUCING SILICON CARBIDE-CARBON COMPOSITE

(75) Inventors: Weiwu Chen, Suita (JP); Yoshinari Miyamoto, Osaka (JP); Tetsuro Tojo, Osaka (JP)

(73) Assignee: Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 14/119,194

(22) PCT Filed: May 24, 2012

(86) PCT No.: PCT/JP2012/063316
§ 371 (c)(1),
(2), (4) Date: Nov. 21, 2013

(87) PCT Pub. No.: WO2012/165291
PCT Pub. Date: Dec. 6, 2012

(65) Prior Publication Data
US 2014/0094355 A1    Apr. 3, 2014

(30) Foreign Application Priority Data
May 27, 2011 (JP) ................... 2011-118580

(51) Int. Cl.
*C04B 35/563* (2006.01)
*C04B 35/622* (2006.01)
(Continued)

(52) U.S. Cl.
CPC .............. *C04B 35/622* (2013.01); *C01B 31/36* (2013.01); *C04B 35/528* (2013.01); *C04B 35/62836* (2013.01); *C04B 35/62884* (2013.01); *C04B 35/62886* (2013.01); *C04B 35/6316* (2013.01); *C04B 35/63468* (2013.01); *C04B 35/638* (2013.01); *C04B 35/645* (2013.01); *C04B 2235/3217* (2013.01); *C04B 2235/3225* (2013.01); *C04B 2235/3826* (2013.01); *C04B 2235/3865* (2013.01); *C04B 2235/3873* (2013.01); *C04B 2235/425* (2013.01); *C04B 2235/5445* (2013.01);
(Continued)

(58) Field of Classification Search
CPC  C04B 35/563; C04B 35/645; C04B 35/5611; C04B 35/571; C04B 35/565; C04B 35/575; C04B 35/5606; C04B 2235/5436
USPC ......................................... 501/87, 88, 90, 93
See application file for complete search history.

(56) References Cited

U.S. PATENT DOCUMENTS 5,338,576 A * 8/1994 Hanzawa et al. .......... 427/430.1
6,328,913 B1 * 12/2001 Shaffer et al. ................. 252/500
2012/0164441 A1  6/2012 Miyamoto et al.

FOREIGN PATENT DOCUMENTS

DE    27 27 314 A1    1/1979
JP    55-42201 A      3/1980
(Continued)

OTHER PUBLICATIONS

Official Communication issued in International Patent Application No. PCT/JP2012/063316, mailed on Jun. 19, 2012.
(Continued)

*Primary Examiner* — Noah Wiese
(74) *Attorney, Agent, or Firm* — Keating & Bennett, LLP

(57) ABSTRACT

Provided is a novel method for producing a silicon carbide-carbon composite. A green body containing a carbonaceous material 2 having silicon nitride attached to a surface thereof is fired to obtain a silicon carbide-carbon composite 1.

14 Claims, 3 Drawing Sheets

(51) Int. Cl.
- *C01B 31/36* (2006.01)
- *C04B 35/528* (2006.01)
- *C04B 35/628* (2006.01)
- *C04B 35/63* (2006.01)
- *C04B 35/634* (2006.01)
- *C04B 35/638* (2006.01)
- *C04B 35/645* (2006.01)
- *B82Y 30/00* (2011.01)
- *C04B 35/52* (2006.01)

(52) U.S. Cl.
CPC ............... *C04B 2235/5454* (2013.01); *C04B 2235/6023* (2013.01); *C04B 2235/6565* (2013.01); *C04B 2235/658* (2013.01); *C04B 2235/666* (2013.01); *C04B 2235/77* (2013.01); *C04B 2235/80* (2013.01); *C04B 2235/96* (2013.01); *C04B 2235/9607* (2013.01); *B82Y 30/00* (2013.01); *C04B 35/522* (2013.01); *C04B 35/62892* (2013.01)

(56) References Cited

FOREIGN PATENT DOCUMENTS

| | | | | |
|---|---|---|---|---|
| JP | 2004-067432 | * | 3/2004 | .............. C04B 35/54 |
| JP | 2004-067432 A | | 3/2004 | |
| JP | 2004-224669 A | | 8/2004 | |
| JP | 2004-339048 A | | 12/2004 | |
| JP | 2011-051866 A | | 3/2011 | |
| JP | 2011-051867 A | | 3/2011 | |
| JP | 2011-84451 A | | 4/2011 | |
| WO | 2011/027757 A1 | | 3/2011 | |

OTHER PUBLICATIONS

English translation of Official Communication issued in corresponding International Application PCT/JP2012/063316, mailed on Dec. 12, 2013.

Official Communication issued in corresponding European Patent Application No. 12794133.4, mailed on Dec. 3, 2014.

* cited by examiner

METHOD FOR PRODUCING SILICON CARBIDE-CARBON COMPOSITE

TECHNICAL FIELD

This invention relates to methods for producing a silicon carbide-carbon composite.

BACKGROUND ART

Silicon carbide-carbon composites are conventionally known in which carbon, such as graphite, and silicon carbide are combined into a composite material. For example, Patent Literature 1 discloses a method for producing a carbon base material coated with silicon carbide by reacting the carbon base material with $SiO_2$ gas. Patent Literature 2 discloses a method for producing a composite of silicon carbide and carbon by mixing carbon and silicon carbide and then firing the mixture.

CITATION LIST

Patent Literature

Patent Literature 1: JP-A-2011-51866
Patent Literature 2: JP-A-2011-51867

SUMMARY OF INVENTION

Technical Problem

There is a need for a further powerful method for producing a silicon carbide-carbon composite.

The present invention has been made in view of the foregoing point and an object thereof is to provide a novel method for producing a silicon carbide-carbon composite.

Solution to Problem

A method for producing a silicon carbide-carbon composite of the present invention includes the step of firing a green body containing silicon nitride and a carbonaceous material. The silicon nitride is preferably attached to a surface of the carbonaceous material.

The method for producing a silicon carbide-carbon composite of the present invention preferably further includes: mixing the silicon nitride, the carbonaceous material, and a binder to obtain a mixture containing the carbonaceous material having the silicon nitride attached to a surface thereof; and forming the mixture to obtain the green body.

In the method for producing a silicon carbide-carbon composite of the present invention, the green body can be obtained by gel-casting.

In the method for producing a silicon carbide-carbon composite of the present invention, the silicon nitride may be used in particulate form.

The silicon nitride preferably has a particle size in a range of 1/100 to 1/5 of a particle size of the carbonaceous material.

In the method for producing a silicon carbide-carbon composite of the present invention, the green body used preferably has a volume ratio between the silicon nitride and the carbonaceous material of 5:95 to 50:50.

In the method for producing a silicon carbide-carbon composite of the present invention, the firing of the green body is preferably performed at 1700° C. or above.

The method for producing a silicon carbide-carbon composite of the present invention is a method for producing a silicon carbide-carbon composite containing the silicon carbide which covers and connects a plurality of pieces of the carbonaceous material.

Advantageous Effects of Invention

The present invention can provide a novel method for producing a silicon carbide-carbon composite.

DESCRIPTION OF EMBODIMENTS

Figure 1:
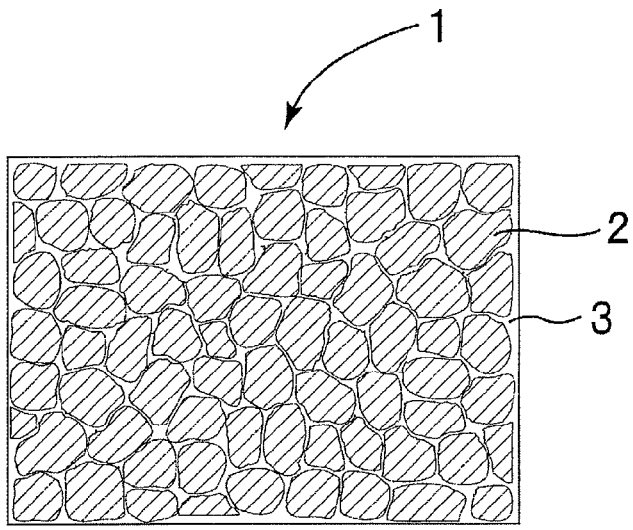
FIG. 1 is a schematic cross-sectional view of a silicon carbide-carbon composite obtained by a production method according to an embodiment of the present invention.

A description will be given below of an example of a preferred embodiment for working of the present invention. However, the following embodiment is simply illustrative. The present invention is not at all limited by the following embodiment.

The drawings to which the embodiment and the like refer are schematically illustrated, and the dimensional ratios and the like of objects illustrated in the drawings may be different from those of the actual objects. The dimensional ratios and the like of specific objects should be determined in consideration of the following descriptions.

(Silicon Carbide-Carbon Composite 1)

FIG. 1 is a schematic cross-sectional view showing a silicon carbide-carbon composite obtained by a production method according to this embodiment. Referring first to FIG. 1, a description is given of the structure of the silicon carbide-carbon composite obtained by the production method according to this embodiment.

The silicon carbide-carbon composite 1 is a composite material formed of a plurality of pieces of carbonaceous material 2 and silicon carbide 3.

The preferred carbonaceous material 2 to be used is, for example, natural graphite made of vein graphite, flake graphite, amorphous graphite or the like; or artificial graphite made from coke or mesophase spherule. The carbonaceous material may be in particulate form. In other words, the carbonaceous material 2 may be carbon particles. The particle size of the carbonaceous material 2 is preferably about 50 nm to about 500 μm, more preferably about 1 μm to about 250 μm, and still more preferably about 5 μm to about 100 μm. If the particle size of the carbonaceous material 2 is too small, the particles may agglomerate. If the carbonaceous material 2 agglomerates too much, the resultant silicon carbide-carbon composite 1 may not be able to acquire carbon characteristics. On the other hand, if the particle size of the carbonaceous material 2 is too large, a ceramic-carbon composite obtained by firing may be reduced in strength. The plurality of pieces of carbonaceous material 2 may contain a single type of carbonaceous material 2 or a plurality of types of carbonaceous materials 2.

The silicon carbide 3 is formed among the plurality of pieces of carbonaceous material 2. The silicon carbide 3 covers the plurality of pieces of carbonaceous material 2 and connects them. The silicon carbide 3 preferably has a continuous structure. The silicon carbide 3 more preferably has a three-dimensional network. In other words, the plurality of pieces of carbonaceous material 2 are preferably integrated by the silicon carbide 3 having a three-dimensional network. In the silicon carbide-carbon composite 1, carbon particles 2 are preferably dispersed in the silicon carbide 3. The carbon particles 2 may be dispersed in agglomerates in the silicon carbide 3.

The silicon carbide 3 may be composed of a single continuous lump or a plurality of isolated lumps.

The volume ratio between the carbonaceous material 2 and the silicon carbide 3 in the silicon carbide-carbon composite 1 (the volume of the carbonaceous material 2 to the volume of the silicon carbide 3) is preferably 95:5 to 50:50 and more preferably 90:10 to 70:30.

The thickness of the silicon carbide 3 is preferably about 100 nm to about 10 μm.

The silicon carbide-carbon composite 1 may contain any compound derived from a sintering aid. Examples of the sintering aid include yttrium oxides, such as $Y_2O_3$, aluminum oxides, such as $Al_2O_3$, calcium oxides, such as CaO, silicon oxides, such as $SiO_2$, and other rare earth oxides.

Next, a description will be given of an example of a method for producing the silicon carbide-carbon composite 1.

(Green Body Producing Step)

A green body is produced which contains the carbonaceous material 2 having silicon nitride attached to a surface thereof.

No particular limitation is placed on the form of silicon nitride to be attached to the surface of the carbonaceous material 2. Examples of the form include particulate form and film form.

If the silicon nitride is in particulate form, the particle size of the silicon nitride is preferably about 50 nm to about 10 μm and more preferably about 100 nm to about 1 μm.

The particle size of the silicon nitride is preferably in a range of 1/100 to 1/5 of the particle size of the carbonaceous material 2. In this case, substantially the entire surface of the carbonaceous material 2 can be covered with the silicon nitride. The particle size of the silicon nitride is more preferably in a range of 1/50 to 1/10 of that of the carbonaceous material 2 and still more preferably in a range of 1/40 to 1/20 of the same.

The mixture ratio between the silicon nitride and the carbonaceous material 2 (the volume of the silicon nitride to the volume of the carbonaceous material 2 (volume ratio between them)) is preferably 5:95 to 50:50 and more preferably 10:90 to 30:70.

No particular limitation is placed on the method for attaching the silicon nitride to the surface of the carbonaceous material 2. For example, the carbonaceous material 2 and the silicon nitride may be mixed together. Specific examples of the mixing include any gas phase method, any liquid phase method, any mechanical mixing method of mixing the silicon nitride and the carbonaceous material 2 using a mixer or the like, any slurry method, and any combined method of them. Specific examples of the gas phase method include the chemical vapor deposition method (CVD method) and the conversion method (CVR method). A specific example of the liquid phase method is the chemical precipitation method. Specific examples of the slurry method include, for example, gel-casting, slip-casting, and tape-casting.

No particular limitation is placed on the method of forming of the carbonaceous material 2 having the silicon nitride attached to the surface thereof. For example, with the use of the gel-casting method, the attachment of the silicon nitride to the surface of the carbonaceous material 2 and the forming of the carbonaceous material 2 can be concurrently performed. In the gel-casting method, a solvent in liquid form and a binder are mixed together to form a slurry, the carbonaceous material is added into the slurry and mixed together, and the mixture is then dried, resulting in a solid mixture. For example, a carbon powder and a silicon nitride powder are added to an isopropanol organic solvent to which acrylamide and N,N'-methylenebisacrylamide are added as binders, the mixture is stirred in a planetary centrifugal mixer to prepare a slurry, and the slurry is poured into a mold and dried, resulting in a green body.

(Firing Step)

Next, the green body is fired. An example of the firing method is the spark plasma sintering method.

The firing temperature and firing time of the green body, the type of firing atmosphere, the pressure in the firing atmosphere and so on can be appropriately selected depending upon the types, shapes, sizes, and so on of the materials used. The firing temperature may be, for example, 1700° C. or above. The firing temperature is preferably about 1700° C. to about 2100° C. and more preferably about 1800° C. to 2000° C. The firing time can be, for example, about five minutes to about two hours. The type of firing atmosphere can be, for example, vacuum atmosphere or inert gas atmosphere, such as nitrogen or argon. The pressure in the firing atmosphere can be, for example, about 0.01 MPa to about 10 MPa.

In the firing step, silicon carbide 3 is formed on the surface of the carbonaceous material 2. At this time, the silicon carbide 3 is formed among the plurality of pieces of carbonaceous material 2. In other words, in the firing step, the plurality of pieces of carbonaceous material 2 are covered with and connected by the silicon carbide 3. Silicon nitride may still remain in the silicon carbide-carbon composite 1.

The silicon carbide-carbon composite 1 obtained by the production method of this embodiment is superior in terms of strength, thermal conductivity and so on to silicon carbide-carbon composites obtained using silicon carbide as a source. The reason for this can be attributed to that the use of silicon nitride as a source facilitates the formation of silicon carbide 3 on the surface of the carbonaceous material 2 at a lower temperature in the firing step and thus promotes the sintering of the silicon carbide more quickly than the use of silicon carbide as a source. Specifically, it can be considered that with silicon carbide as a source, the driving force for sintering depends only upon reduction in particle surface energy, whereas with silicon nitride as a source, the chemical reaction of conversion from silicon nitride to silicon carbide further promotes the sintering. It can be considered that the continuity of the silicon carbide 3 in the silicon carbide-carbon composite 1 increases with the progress of sintering and the strength and thermal conductivity increases with increasing continuity of the silicon carbide 3. Therefore, it can be considered that since the production method of this embodiment employs silicon nitride as a source, the method can provide a silicon carbide-carbon composite 1 excellent in strength, thermal conductivity, and so on.

With the production method according to this embodiment, a silicon carbide-carbon composite 1 can be easily produced at a reduced temperature even without the use of silicon carbide as a source.

Hereinafter, the present invention will be described in more detail with reference to specific examples. The present invention is not at all limited by the following examples. Modifications and variations may be appropriately made therein without changing the gist of the present invention.

EXAMPLE 1

A silicon carbide-carbon composite having substantially the same structure as the silicon carbide-carbon composite 1 was produced in the following manner.

As the carbonaceous material 2, graphite (mesophase spherule manufactured by Toyo Tan so Co., Ltd.) was used. As the silicon nitride, $Si_3N_4$ manufactured by Ube Industries, Ltd. was used.

A mixed powder of graphite (10 g), silicon nitride (4.63 g), and $Al_2O_3$ (0.31 g) and $Y_2O_3$ (0.15 g) as sintering aids; and a binder solution (3.57 g) containing acrylamide (8 g) and N,N'-methylenebisacrylamide (1 g) dissolved in isopropanol (45 g) were mixed by the gel-casting method and the mixture was cast in a plastic mold. The volume ratio between graphite and ceramic in the mixture was 80:20. The resultant mixture was dried at 80° C. under ordinary pressure for 12 hours to obtain a dry product. Next, the dry product was heated at 700° C. under vacuum for an hour to remove acrylamide as the binder. Furthermore, using the spark plasma sintering method, the dry product was sintered by passage of pulse current at 1700° C. under vacuum condition for five minutes with the application of a pressure of 30 MPa. As a result, a silicon carbide-graphite composite was obtained as a silicon carbide-carbon composite.

The obtained silicon carbide-graphite composite was measured in terms of bulk density, relative density, bending strength, and thermal conductivity in the following manners. The results are shown in Table 1 below.

[Bulk Density]
The bulk density was measured by the Archimedes' method. Specifically, the bulk density was measured in accordance with JIS A 1509-3.

[Relative Density]
The relative density was calculated from the ratio between the bulk density measured by the above method and the theoretical density of the same sample (density thereof with no pore) (see JIS Z 2500-3407).

[Bending Strength]
The bending strength was measured by the three-point bending test. Specifically, the bending strength was measured in accordance with JIS A 1509-4.

[Thermal Conductivity]
The thermal conductivity was measured by the laser flash method. Specifically, the thermal conductivity was measured in accordance with JIS R 1650-3.

Figure 2:
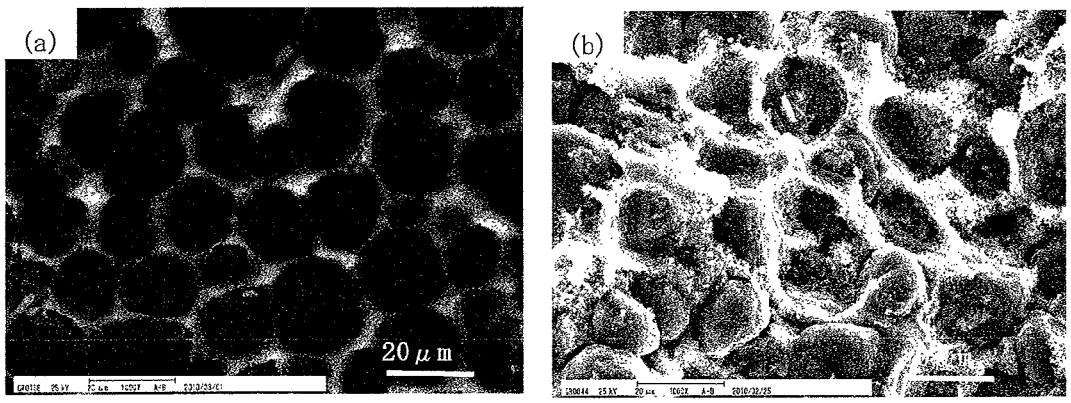
FIG. 2 is scanning electron micrographs of a silicon carbide-graphite composite obtained in Example 1 (in which (a) and (b) show its surface and fracture surface, respectively).

FIG. 2 shows scanning electron micrographs of the silicon carbide-graphite composite obtained in Example 1 (in which (a) and (b) show its surface and fracture surface, respectively, both at 1000-fold magnification).

EXAMPLE 2

Figure 3:
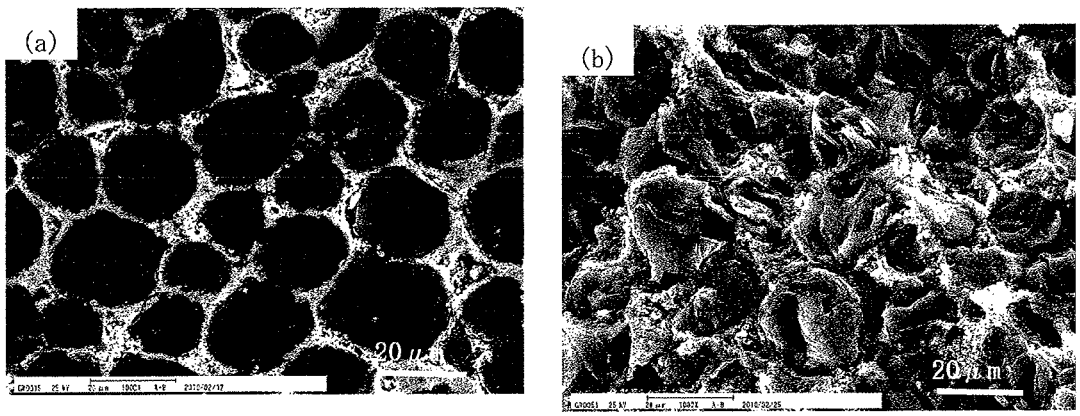
FIG. 3 is scanning electron micrographs of a silicon carbide-graphite composite obtained in Example 2 (in which (a) and (b) show its surface and fracture surface, respectively).

A silicon carbide-graphite composite was obtained in the same manner as in Example 1 except that the sintering was performed by passage of pulse current at 1750° C. The obtained silicon carbide-graphite composite was measured in terms of bulk density, relative density, bending strength, and thermal conductivity in the same manners as in Example 1. The results are shown in Table 1 below. FIG. 3 shows scanning electron micrographs of the silicon carbide-graphite composite obtained in Example 2 (in which (a) and (b) show its surface and fracture surface, respectively, both at 1000-fold magnification).

EXAMPLE 3

Figure 4:
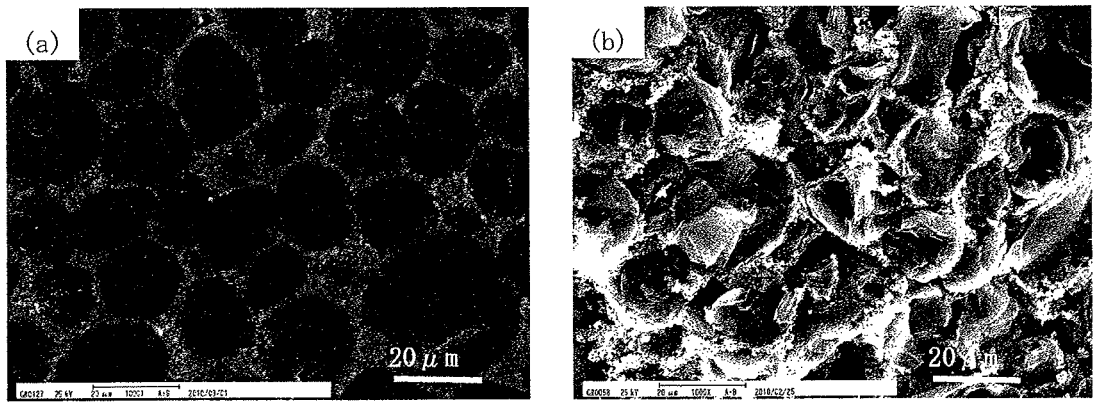
FIG. 4 is scanning electron micrographs of a silicon carbide-graphite composite obtained in Example 3 (in which (a) and (b) show its surface and fracture surface, respectively).

A silicon carbide-graphite composite was obtained in the same manner as in Example 1 except that the sintering was performed by passage of pulse current at 1800° C. The obtained silicon carbide-graphite composite was measured in terms of bulk density, relative density, bending strength, and thermal conductivity in the same manners as in Example 1. The results are shown in Table 1 below. FIG. 4 shows scanning electron micrographs of the silicon carbide-graphite composite obtained in Example 3 (in which (a) and (b) show its surface and fracture surface, respectively, both at 1000-fold magnification).

EXAMPLE 4

Figure 5:
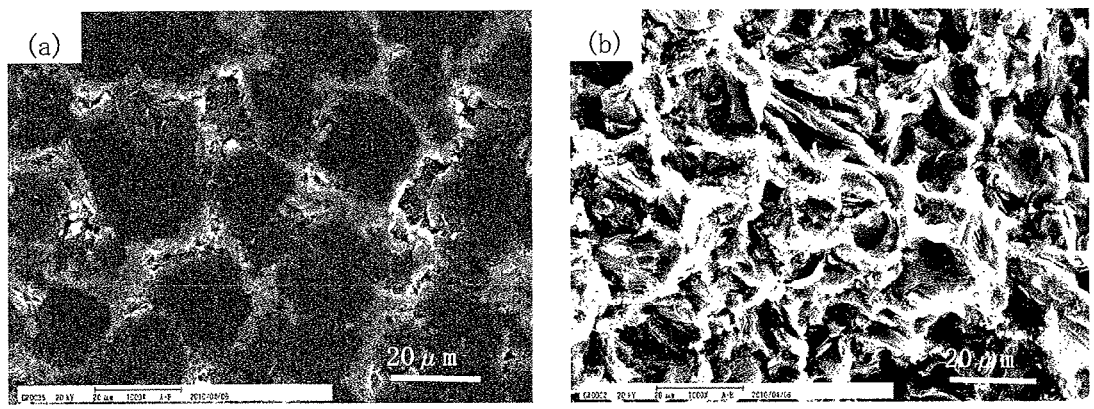
FIG. 5 is scanning electron micrographs of a silicon carbide-graphite composite obtained in Example 4 (in which (a) and (b) show its surface and fracture surface, respectively).

A silicon carbide-graphite composite was obtained in the same manner as in Example 1 except that the sintering was performed by passage of pulse current at 1900° C. The obtained silicon carbide-graphite composite was measured in terms of bulk density, relative density, bending strength, and thermal conductivity in the same manners as in Example 1. The results are shown in Table 1 below. FIG. 5 shows scanning electron micrographs of the silicon carbide-graphite composite obtained in Example 4 (in which (a) and (b) show its surface and fracture surface, respectively, both at 1000-fold magnification).

EXAMPLE 5

A silicon carbide-graphite composite was obtained in the same manner as in Example 4 except that a mixed powder of graphite (10 g), silicon nitride (5.96 g), and $Al_2O_3$ (0.39 g) and $Y_2O_3$ (0.20 g) as sintering aids; and 1-propanol (3.83 g) containing acrylamide as an organic monomer were mixed by the gel-casting method. The volume ratio between graphite and ceramic in the mixture was 80:20.

The obtained silicon carbide-graphite composite was measured in terms of bulk density, relative density, bending strength, and thermal conductivity in the same manners as in Example 1. The results are shown in Table 1 below.

Figure 6:
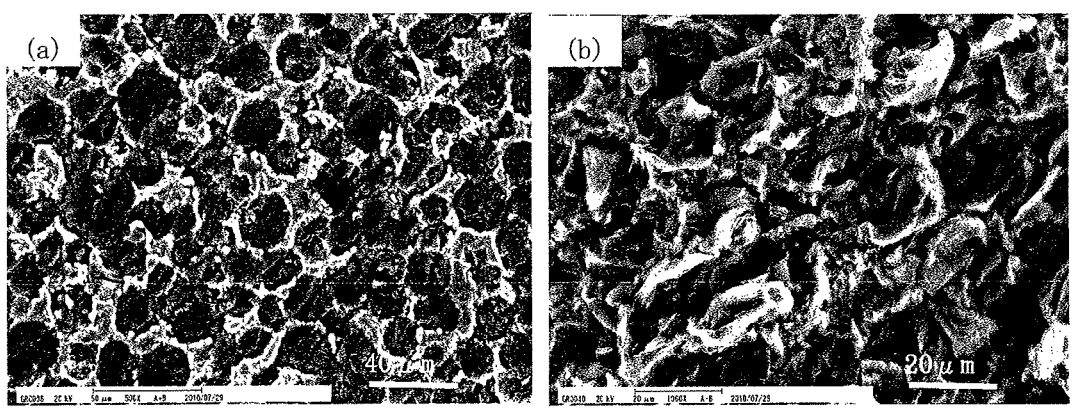
FIG. 6 is scanning electron micrographs of a silicon carbide-graphite composite obtained in Example 5 (in which (a) and (b) show its surface and fracture surface, respectively).

FIG. 6 shows scanning electron micrographs of the silicon carbide-graphite composite obtained in Example 5 (in which (a) and (b) show its surface at 500-fold magnification and its fracture surface at 1000-fold magnification, respectively).

COMPARATIVE EXAMPLE 1

A silicon carbide-graphite composite was obtained in the same manner as in Example 4 except that a mixed powder of graphite (10 g), silicon carbide (SiC 4.50 g), and $Al_2O_3$ (0.30 g) and $Y_2O_3$ (0.15 g) as sintering aids; and a binder solution (3.03 g) containing acrylamide (8 g) and N,N'-methylenebisacrylamide (1 g) dissolved in isopropanol (45 g) were mixed by the gel-casting method. The volume ratio between graphite and ceramic in the mixture was 75:25.

Figure 7:
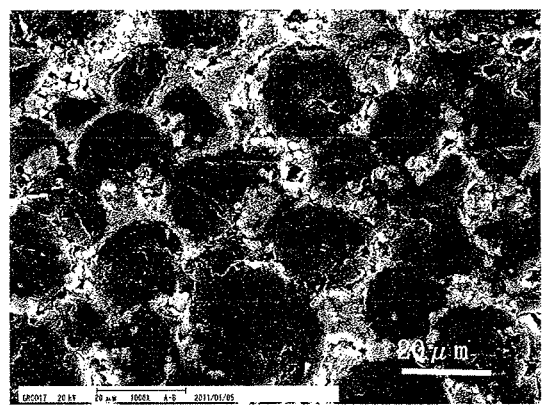
FIG. 7 is a scanning electron micrograph of a surface of a silicon carbide-graphite composite obtained in Comparative Example 1.

The obtained silicon carbide-graphite composite was measured in terms of bulk density, relative density, bending strength, and thermal conductivity in the same manners as in Example 1. The results are shown in Table 1 below. FIG. 7 shows a scanning electron micrograph of a surface of the silicon carbide-graphite composite obtained in Comparative Example 1 (at 1000-fold magnification).

COMPARATIVE EXAMPLE 2

A silicon carbide-graphite composite was obtained in the same manner as in Example 4 except that a mixed powder of graphite (10 g), silicon carbide (SiC 5.96 g), and $Al_2O_3$ (0.39 g) and $Y_2O_3$ (0.20 g) as sintering aids; and 1-propanol (3.24 g) containing acrylamide as an organic monomer were mixed by the gel-casting method. The volume ratio between graphite and ceramic in the mixture was 70:30.

Figure 8:
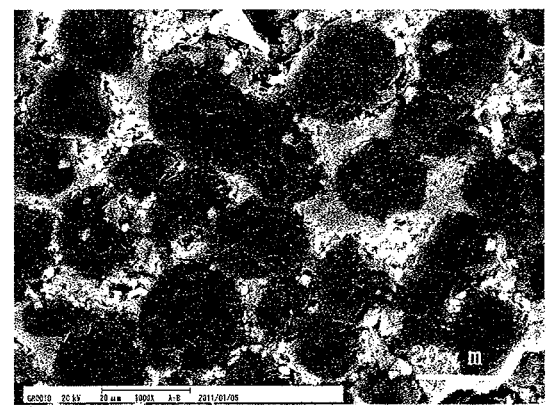
FIG. 8 is a scanning electron micrograph of a surface of a silicon carbide-graphite composite obtained in Comparative Example 2.

The obtained silicon carbide-graphite composite was measured in terms of bulk density, relative density, bending strength, and thermal conductivity in the same manners as in Example 1. The results are shown in Table 1 below. FIG. 8 shows a scanning electron micrograph of a surface of the silicon carbide-graphite composite obtained in Comparative Example 2 (at 1000-fold magnification).

COMPARATIVE EXAMPLE 3

A silicon carbide-graphite composite was obtained in the same manner as in Example 4 except that a mixed powder of graphite (10 g), aluminum nitride (AlN 3.54 g), and $Y_2O_3$ (0.19 g) as a sintering aid and a binder solution (2.49 g) containing acrylamide (8 g) and N,N'-methylenebisacrylamide (1 g) dissolved in isopropanol (45 g) were mixed by the gel-casting method. The volume ratio between graphite and ceramic in the mixture was 70:30.

The obtained silicon carbide-graphite composite was measured in terms of bulk density, relative density, bending strength, and thermal conductivity in the same manners as in Example 1. The results are shown in Table 1 below.

TABLE 1

|  | Sintering Temperature (° C.) | Bulk Density (g/cm³) | Relative Density (%) | Bending Strength (MPa) | Thermal Conductivity (W/m · K) |
| --- | --- | --- | --- | --- | --- |
| Ex. 1 | 1700 | 2.21 | 90 | 64 | 34 |
| Ex. 2 | 1750 | 2.21 | 90 | 79 | 71 |
| Ex. 3 | 1800 | 2.10 | 86 | 71 | 85 |
| Ex. 4 | 1900 | 2.36 | 97 | 135 | 140 |
| Ex. 5 | 1900 | 2.42 | 97 | 150 | 138 |
| Comp. Ex. 1 | 1900 | 2.29 | 94 | 58 | 101 |
| Comp. Ex. 2 | 1900 | 2.36 | 94 | 54 | 107 |
| Comp. Ex. 3 | 1900 | 2.34 | 98 | 100 | 170 |

REFERENCE SIGNS LIST

1 . . . silicon carbide-carbon composite
2 . . . carbonaceous material
3 . . . silicon carbide

The invention claimed is:

1. A method for producing a silicon carbide-carbon composite, comprising firing a green body containing particulate silicon nitride and a carbonaceous material to obtain the silicon carbide-carbon composite, wherein the silicon nitride has a particle size in a range of 1/100 to 1/5 of a particle size of the carbonaceous material.

2. The method for producing a silicon carbide-carbon composite according to claim 1, wherein the silicon nitride is attached to a surface of the carbonaceous material in the green body.

3. The method for producing a silicon carbide-carbon composite according to claim 1, further comprising: mixing the silicon nitride, the carbonaceous material, and a binder to obtain a mixture containing the carbonaceous material having the silicon nitride attached to a surface thereof; and forming the mixture to obtain the green body.

4. The method for producing a silicon carbide-carbon composite according to claim 1, wherein the green body used has a volume ratio between the silicon nitride and the carbonaceous material of 5:95 to 50:50.

5. The method for producing a silicon carbide-carbon composite according to claim 1, wherein the firing of the green body is performed at 1700° C. or above.

6. The method for producing a silicon carbide-carbon composite according to claim 1, the silicon carbide-carbon composite containing the silicon carbide which covers and connects a plurality of pieces of the carbonaceous material.

7. The method for producing a silicon carbide-carbon composite according to claim 1, wherein the silicon nitride has a particle size in a range of 1/100 to 1/10 of a particle size of the carbonaceous material.

8. A method for producing a silicon carbide-carbon composite, comprising firing a green body containing silicon nitride and a carbonaceous material to obtain the silicon carbide-carbon composite, wherein the firing of the green body is performed at 1700° C. or above.

9. The method for producing a silicon carbide-carbon composite according to claim 8, wherein the silicon nitride is attached to a surface of the carbonaceous material in the green body.

10. The method for producing a silicon carbide-carbon composite according to claim 8, further comprising: mixing the silicon nitride, the carbonaceous material, and a binder to obtain a mixture containing the carbonaceous material having the silicon nitride attached to a surface thereof; and forming the mixture to obtain the green body.

11. The method for producing a silicon carbide-carbon composite according to claim 8, wherein the silicon nitride is used in particulate form.

12. The method for producing a silicon carbide-carbon composite according to claim 11, wherein the silicon nitride has a particle size in a range of 1/100 to 1/5 of a particle size of the carbonaceous material.

13. The method for producing a silicon carbide-carbon composite according to claim 8, wherein the green body used has a volume ratio between the silicon nitride and the carbonaceous material of 5:95 to 50:50.

14. The method for producing a silicon carbide-carbon composite according to claim 8, the silicon carbide-carbon composite containing the silicon carbide which covers and connects a plurality of pieces of the carbonaceous material.

* * * * *